United States Patent Office 2,757,164
Patented July 31, 1956

2,757,164

NITROGEN CONTAINING RESINOUS PRODUCTS FROM KETO-AMIDES

Herman S. Bloch, Chicago, and Ralph B. Thompson, Hinsdale, Ill., assignors to Universal Oil Products Company, Chicago, Ill., a corporation of Delaware No Drawing. Application September 27, 1954, Serial No. 458,664

11 Claims. (Cl. 260—65)

This invention is a continuation-in-part of our copending and now abandoned application, Serial No. 233,238, filed June 23, 1951, which is a continuation-in-part of application Serial No. 756,087, filed June 20, 1947, now Patent No. 2,557,935, issued June 26, 1951.

The present invention relates to a process for the production of resinous materials useful in many arts such as components of coating compositions, as raw materials in the formation of moldable plastic-like objects, as plasticizers in rubber compositions and for other uses common to resins of the present type. More particularly, the invention concerns a new class of resinous product characterized either as a thermosetting or as thermoplastic type depending upon the structure of the reactants as hereinafter set forth, said resin being formed by the inter-condensation of keto-amides or by condensing a keto-amide with an aromatic polyketone and/or a polysulfonamide at reaction conditions resulting in the liberation of water as a by-product of the reaction and the condensation of the reactants to form said resinous product.

The formation of the present resinous condensation product is ordinarily effected in the absence of any recognized catalytic agent. One object of this invention, therefore, is to prepare a thermosetting or thermoplastic resinous material (depending upon the conditions of reaction and the structure and type of keto and sulfonamide reactants employed) by means of a simple condensation reaction in the absence of any added catalytic agent, thereby eliminating the necessity of removing or recovering catalytic material from the finished resinous product following the condensation reaction in which the resin is formed.

It is another object of the invention to provide a process for the production of resinous materials useful in the preparation of coating compositions such as paints and varnishes, as plasticizers for synthetic or natural rubber, as raw materials in the formation of moldable plastic-like objects, as adhesives and for other uses of like character.

In one of its specific applications, the present invention concerns a process for the preparation of a resinous material which comprises reacting a non-intracondensable keto-amide with at least one compound selected from the group consisting of: (1) a member of the class consisting of said aforementioned keto-amides, (2) an aromatic polyketone and (3) a polysulfonamide in which the amide groups contain at least one replaceable hydrogen atom attached to the nitrogen atom of the said groups at condensation reaction conditions resulting in the formation of said resinous material.

A more specific embodiment of the invention relates to a process which comprises reacting an aromatic diketone with a disulfonamide and a ketosulfonamide in which the keto carbonyl and sulfonamide groups are separated by at least 4 carbon atoms in the aliphatic chain, and wherein each sulfonamide groups contains at least one replaceable hydrogen atom attached to the nitrogen atom of said group at a temperature of from about 50° to about 350° C., forming as a result of the reaction a thermoplastic resinous condensation product.

Other embodiments of the invention relating to specific reactants and to certain means of effecting the condensation reaction will be hereinafter referred to in the following further description of the invention.

In accordance with the present process, an aromatic polyketone, wherein the keto groups are attached either to an aryl nucleus or to a carbon atom in the side chain attached to the aryl nucleus, together with a polysulfonamide of either aliphatic, aromatic, alicyclic or heterocyclic structure and containing at least one condensable or replaceable hydrogen atom per amide group are reacted at condensation reaction conditions with a ketoamide of the class hereinafter defined to yield a resinous condensation product which may vary in hardness from soft pliable masses to hard, brittle solids and which normally have clear, transparent properties and in some cases a color ranging from light to darker shades of amber.

The reaction mechanism, by means of which the present resinous products are believed to be formed, presumably involves the condensation of one or both of the hydrogen atoms of the amide groups present in the polysulfonamide or keto-amide reactants (depending upon reaction conditions and whether an un-substituted or an N-substituted sulfonamide is employed in the reaction) with the keto oxygen atoms of the aromatic polyketone or keto-amide reactants forming water and the resinous condensation products herein provided. In a given resinous product formed by the condensation of a ketosulfonamide (representing one of the alternative types of keto-amides utilizable in the present condensation reaction), there may appear one or more monomer condensate units in accordance with the following equation in which the products have one or more of the structures given in Formulas A, B, C, D, E, and F shown in the equation. In addition, structural units arising from the interaction of (1) and (2) may also be present, as taught in our aforementioned copending application. Similar structural formulae may be shown as illustrative of the types of linkages obtained in the condensation of a ketocarboxamide with an aromatic polyketone and/or a polysulfonamide reactant.

(A)
$$R'''-C=N-SO_2-R''- + H_2O$$
$$\quad\quad |$$
$$\quad\quad Ar$$

where R' is hydrogen.

(B)
$$\begin{array}{c} Ar \quad R' \\ \phantom{X}\diagdown / \\ C \\ / \phantom{X}\diagdown \\ R \quad N-SO_2-R''- \\ \end{array} \quad \begin{array}{c} N-SO_2-R''- \\ \\ +H_2O \end{array}$$

where R' is not hydrogen.

where R' is not hydrogen.

(D)
$$R-(\overset{O}{\overset{\|}{C}})_n$$
$$R''$$
$$\overset{|}{SO_2}$$
$$(H-N-R')_p$$

(1) $Ar(C=O)_n$
           $\overset{|}{R'''}$ (2) $(R^{IV}-\overset{H}{\overset{|}{N}}-SO_2-)_n-R^V \longrightarrow$ (3) $(N-SO_2-)_nR''-(-\overset{O}{\overset{\|}{C}}-R)_n$
    $\overset{|}{H}$
    $\overset{|}{R'}$ $$R-\overset{O}{\overset{\|}{C}}-R''-SO_2-N=C\diagup\overset{R}{\diagdown_{R''-SO_2-}}$$

where R' is hydrogen.

(E) 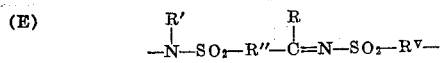

where $R^{IV}$ is hydrogen.

(F) 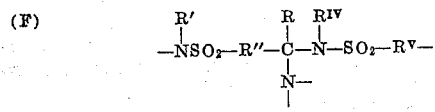

where $R^{IV}$ is not hydrogen.

In the above formulas Ar is an aromatic nucleus, R, R''' and $R^V$ each may represent an alkyl, cycloalkyl, aryl, alkenyl, aralkyl, or alicyclic radical, R' and $R^{IV}$ each represents one of the foregoing radicals or hydrogen, R'' represents a divalent radical selected from the group consisting of alkylene, cycloalkylene, arylene and aralkylene, a divalent heterocyclic radical, or a polyvalent radical derived from these, and $n$ is a whole numeral from 1 to 4. The aromatic nucleus, Ar may be derived from the mono or polynuclear aromatics such as benzene, diphenyl, anthracene, naphthalene, etc. In any of the formulations represented by (A), (B), (C), (D), (E) or (F) the so-called cross-linkage type of linkage may be present in the structure of the condensation product. Cross-linking is believed to occur when some components of functionality greater than two participate in the reaction and when one hydrogen atom from one of the amide groups and another hydrogen atom from a second amide group, the amide groups being either on the same or on different polysulfonamide molecules or on a ketoamide molecule, condense with a single keto group of the aromatic polyketone or keto-amide reactant. When the so-called cross-linking effect is obtained, depending upon the reaction conditions and the type of polysulfonamide and ketoamide charged, the resulting resinous product is a high molecular weight molecule containing a highly branched chain structure in which at least some of the linkages are believed to be in non-linear relationship to each other and wherein the linkages are believed to extend between chains or adjacent condensate units of the keto-amide condensation product resin molecule. On the other hand when the type of linkage shown by Formula A above is obtained as a result of the condensation of a keto group with a single amido group, or when each reactant molecule has a functionality not greater than two, the resinous condensate is a linear chain-like molecule, giving rise to a thermoplastic type of resin comprising a number of condensate units joined in a continuous chain-like or linear fashion and forming a polymer of said condensate units which may be fused at a reasonably low temperature and which is relatively soluble in organic solvents. Usually, all types of the above structural arrangements or linkages shown are present in a given resinous product, although when a large number of cross-linking arrangements are present in the resinous product, the latter is likely to be thermosetting, and is likely to form a product which is insoluble in organic solvents.

The reactant herein referred to as the aromatic polyketone which when reacted with a keto-amide alone or in combination with a polysulfonamide forms the present resinous condensation product, is defined structurally as a compound containing an aromatic nucleus which is either mono-nuclear (that is, benzenoid) in structure or poly-nuclear, the former being represented as derived from benzene and the latter as being derived from such poly-nuclear aromatics as for example naphthalene, anthracene, phenanthrene, etc. Polyketones derived from heterocyclic aromatic compounds, as for example, quinoline, coumarone, benzothiofuran, carbazole and the like are also suitable reactants of this class. The aromatic polyketone is further characterized as being substituted on at least one of the nuclear positions of the aryl radical by an acyl group and/or a radical containing one or more keto groups, the total number of keto groups being at least two. The indicated aromatic polyketone may be represented by such compounds as o-, m-, or p-diacetyl-benzene, the various diacetyldiphenyls, o-, m, or p-acetyl-benzophenone, benzil or benzil-like compounds wherein the keto groups are separated by an intervening alkylene group (as, for example, in dibenzoylmethane) and others of the class containing two or more keto groups or containing other radicals such as alkyl, alkenyl, aryl, cycloalkyl, amino, halo, nitro, hydroxy, carboxy, alkoxy, acyloxy or sulfo substituents. In general, however, we prefer to employ polyketones in which the keto groups are the sole amide-reactive groups, as the condensation reaction is more readily controllable in such cases. The molecular weight and number of keto groups in the aromatic polyketone reactant determines the molecular weight of the resultant resinous condensation product. Any number of keto groups may be present in the aromatic polyketone, and its molecular weight is limited only by practical considerations, such as its melting point, which ordinarily must be sufficiently low for the compound to melt at the reaction temperature and mix with the other reactants.

The reactant herein specified as a polysulfonamide utilized as one of the alternative reacting materials in the present condensation reaction to form the resinous product of this invention, may be selected from the aliphatic, alicyclic, heterocyclic or aromatic polysulfonamides which may further be saturated or unsaturated in character. The polysulfonamides may also be mono-substituted on one or more of the amido nitrogen atoms by alkyl, aryl, aralkyl, cycloalkyl or heterocyclic groups and may contain one or more radicals other than said sulfonamide groups attached to the hydrocarbon residue of the sulfonamide molecule such as amino, halo, alkoxy, hydroxy, carboxy, nitro or acyloxy groups as well as the thio acid and carboxylic acid amide radicals, the latter groups when present in the structure of a polysulfonamide generally altering the physical and chemical properties of the ultimate resinous condensation product obtained in the process of this invention. It is preferred, however, that any other substituent be non-reactive with keto groups, so that the sulfonamide groups are the only keto-reactive groups present in the sulfonamide molecule. Typical representative examples of the polysulfonamide reactants utilizable in the condensation reaction of the present process, comprising, however, merely representative examples of the types specified above are such compounds as 1,2-ethanedisulfonamide, as exemplary of the aliphatic, saturated polysulfonamides, 4,5-disulfonamido-hexene-2, representing the aliphatic unsaturated polysulfonamide; ethane-1-sulfonamide-2-(N-methyl) sulfonamide, an N-substituted sulfonamide; 1,3-cyclohexane-disulfonamide and 3,5-di-sulfonamido-cyclohexene-1, representing the saturated and unsaturated alicyclic polysulfonamide; p-benzenedi-sulfonamide, representing an aryl polysulfonamide; 1 - sulfonamido - 2-(m-sulfonamido)-phenylethane, an aralkyl polysulfonamide; 2,4-pyridine-disulfonamide of the heterocyclic polysulfonamide; and bis (2-chloro-4-sulfonamido-benzenesulfonyl)amide as a representative polysulfonamide substituted on the aryl nucleus by non-reactive radicals, and others.

Of the many types and classes of polysulfonamides utilizable as reactants in the present process, it is characteristic of said compound that the amido nitrogen also has attached thereto at least one and preferably two hydrogen atoms capable of condensation with the keto group of the aromatic polyketone reactant or the keto group of the keto amide reactant to form the resinous condensation product herein described. If mono N-substituted polysulfonamides are utilized as reactants, the substituent may be such radicals as alkyl, alkenyl, aryl, aralkyl or alicyclic groups which may be further substituted with radicals such as hydroxy, carboxy, nitro, amino, etc. The presence of unsaturated linkages within the organic residue of the poly-sulfonamide, ketoamide or aromatic polyketone reactants, such as compounds containing alkenyl and/or alkadienyl groups, generally renders the resinous condensation product subject to further polymerization, as for example, at high temperatures and in general, alters the physical properties of the product. The products from reactants containing unsaturated linkages or groups are generally of higher melting point, and are frequently more brittle or are more highly elastic than products formed from substantially saturated reactants.

The class of compounds designated herein as ketoamides and utilizable as one of the reactants condensable with another molecule of the same compound, with another member of the same class of compounds or with an aromatic polyketone and/or a polysulfonamide to form the present resinous materials may be selected broadly from the keto-substituted sulfonamides, carboxamides and the thio acid amides and may be of saturated or unsaturated aliphatic or aromatic structure and the aromatic may be of mono- or polynuclear structure. The molecular structure of the ketoamide compounds useful as suitable reactants in the present resinifying reaction are, in general, qualified by the requirement that the keto and amide substituents are spacially separated by a sufficient number of carbon atoms to obviate their intra-condensation within the same molecule to thereby eliminate independent ring closure between the amide and keto groups at the resin-forming reaction conditions specified for the present process. Intramolecular- or self-condensation of the keto and amide groups within the same reactant molecule is to be distinguished from the type of condensation characterized as intermolecular condensation of the keto and amide substituents on different molecules of the ketoamide reactant derived from either the same or different ketoamide compounds charged to the reaction. Thus, in intra- or self-condensation, a ring closure occurs in a single molecule of the ketoamide at the resinifying reaction conditions, whereas in the desired inter-condensation occurring when utilizing compounds of the qualified structure herein provided, the keto group on one molecule of the ketoamide may condense independently of the amide group in the same molecule of ketoamide, thereby forming a bridge or bond between different molecules of the reactants. In order to obviate undesirable intra- or self-condensation of the ketoamide reactant, the keto and amide substituents must be separated by at least three carbon atoms in the aromatic series of ketoamides, and by at least four carbon atoms in the aliphatic and saturated alicyclic series of ketoamides. Thus, in the benzene series, the amido and keto substituents, if nuclearly substituted, must be at least meta and may be para to each other, but should not be in ortho position, unless the keto and/or amido groups are substituted on an alkyl, alkenyl or aryl side chain substituent on the aryl nucleus. Cyclization between the amido and keto groups to eliminate water of condensation occurs more readily in the aliphatic and alicyclic series and it is therefore essential that the condensable groups be substituted on more widely separated carbon atoms in the chain in order to obviate said cyclization or ring closure. Typical representative ketoamides utilizable as reactants condensable with themselves or with an aromatic polyketone and/or a polyamide include such compounds as m- and p-acetylbenzene-sulfonamide, m- and p-acetylbenzenecarboxamide, 4,4'-carbamylbenzophenone, m- and p-sulfonamidophenylacetone, the acetyl-(N-methyl) benzenedi-sulfonamides, 1-acetyl-4-sulfonamidocyclohexane, 1-carbamylbutylmethylketone, 2-sulfonamidohexylmethylketone, 1-acetyl-3-thiocarbamidopropane, and others of aromatic, aliphatic, alicyclic, and heterocyclic structure.

It is a further general requisite of the polysulfonamide, the aromatic polyketone, and ketoamide reactants that they melt at temperatures below the condensation reaction temperature hereinafter specified, thereby enabling the reactant to be intimately mixed while in a molten state and permitting the respective amido and keto functional groups thereof to come into inter-molecular contact and effect condensation of the reacting components. Alternatively, the reactant may be dissolved in a suitable solvent which mutually dissolves the reactants and thus permits the requisite inter-molecular contact of the amido and keto functional groups.

The condensation reaction involved in the present process is effected at temperatures of from about 50° to about 350° C., the lower temperature limits of the above range being provided for reactants having low melting points, such as the low molecular weight polysulfonamides and the aromatic polyketones and for those reactants which condense rapidly at mild temperature conditions. The reaction is undesirably sluggish below about 50° C., and temperatures above about 350° C. result in excessive decomposition and degradation reactions. In the case of the less reactive starting materials of those reactants having a high melting point, the mixture of reactants is desirably heated to temperatures within the upper limits of the above temperature range to effect condensation at a reasonably rapid rate. In some instances, especially in case one of the above classes of starting materials melts at a high temperature, it will be preferable to employ a low-melting compound for the other class of starting material. Thus, the low-melting reactant while in a molten state dissolves the reactant or reactants melting at a high temperature and permits the intimate admixture desirable for obtaining reaction between the functional groups of the reactants. Usually it is not necessary to employ superatmospheric pressures in carrying out the reaction, except in case of utilizing a low boiling reactant and/or a high temperature to effect the reaction when it becomes desirable to maintain the latter material in liquid phase during the reaction.

In some cases it may be advantageous to employ catalyst of an acidic or dehydrating nature, such as zinc chloride, hydrogen chloride, and the like. The proportion of reactants employed in the condensation will vary in accordance with the type and number of amide groups and keto groups in each of the respective reactants. In the case of a polysulfonamide reactant in which the amido groups are not substituted by non-condensable groups (that is, groups other than hydrogen, such as alkyl or aryl), equimolecular proportions of the aromatic polyketone will theoretically react with a given proportion of polysulfonamide or N-substituted ketoamide reactant in which the combined number of N-substituted amide groups in the ketoamide and polysulfonamide is the same as the number of keto groups in both the aromatic polyketone and the ketoamide. In the case of a polysulfonamide and/or ketoamide reactant in which all of the amido nitrogen atoms are mono-substituted by a non-condensable group, the corresponding theoretical ratio of reactants is two sulfonamide groups to each ketone group. Expressed in another manner, it may be said that the ketone group is mono-functional with respect to a sulfonamido group ($-SO_2NH_2$) or carbamyl group ($H_2NCO-$) and bifunctional with respect to an alkyl substituted amido group ($-SO_2NHR$, or $RHNCO-$, where R' is alkyl, aryl, aralkyl, alkenyl, cycloalkyl, etc.); and the proportions of reactants are so adjusted that there are at least equifunctional amounts of keto and amide groups, preferably up to about two reactive equivalents of said keto groups to said amide groups.

It is within the scope of the present invention to effect the condensation reaction in the presence of a solvent which is miscible with the reactive starting materials and/or the resinous product. The solvent, when utilized, may be selected from hydrocarbons having suitable boiling points such as hexane, benzene, petroleum ether and in some cases inert non-hydrocarbon solvents such as diphenyloxide, other ethers such as dipropyl ether, dibutyl ether, etc. It is preferred to utilize a solvent which boils at a temperature above the reaction temperature required for the condensation reaction, although in some instances, the solvent may be present in the reaction mixture for the express purpose of providing a refluxing medium which maintains the temperature of reaction at a constant value, the boiling point of the solvent. The solvent may also be expressly added to the reaction mixture to form an azeotrope with the water liberated during the condensation reaction, thus providing a means for removing the latter by-product from the reaction mixture, either during the condensation reaction or following the formation of the product. In many cases, it is desirable to employ the solvent as a diluent of the reactants so as to control the rate of reaction or the temperature developed in the reaction mixture. When such precautions are taken, the product usually has a more desirable color and its other physical properties, such as flexibility and hardness are improved.

After completion of the initial condensation reaction and the separation of the product thereof from the reaction mixture, the resin may be dried and pulverized into a finely divided condition suitable for subsequent molding operations, mixing into protective or covering compositions or for utilization in the manufacture of other compositions, such as plastics. In case an excess of either reactant is employed in the condensation reaction, or if the initial stage of the reaction is not allowed to proceed to complete condensation of the components, the reaction product separated from the initial stage of the condensation may be further reacted with additional quantities of one or more of the reactants to form thereby a product having properties differing from the initial or partial condensation product. Alternatively, the excess of reactant may be removed from the product by extraction with a suitable solvent, for example, one which is miscible with either the excess reactant or with the resinous product to effect thereby a separation of these components from the partial condensation product. The final stage of the reaction or completion of the condensation of the reactants present in the partially condensed product may be conducted in a heated mold or other shaping apparatus when desired. A convenient means for forming molded articles is to conduct the initial reaction to a stage of partial completion, forming thereby a soft, resinous product which usually possesses thermoplastic properties and thereafter completing the reaction by heating the initial reaction product in the desired mold, thus forming the thermosetting resinous product of this invention which is relatively little deformed at a high temperature and in general is tougher than the initial or partial condensation product.

Resinous products obtained in the present process have widespread utility in various arts, depending in large measure upon the physical properties of the product. The resins, for example, may be composited with various drying oils such as the glyceride type or unsaturated hydrocarbon type to form varnish and/or paint compositions, and when employed for said purposes, the resins contribute valuable film-forming and bodying properties to such compositions. The protective coatings prepared from the present resins form a glossy surface resistant to chemicals, water and abrasive agents and such coating compositions in which the solid resins of this invention are incorporated dry to hard non-tacky films. In some cases, the products of this invention are useful as plasticizers, especially when the product is a semi-solid or viscous liquid resin. When solid resinous products of the thermoplastic type are obtained, these may be melted or extruded into variously shaped articles or used to impregnate cellulosic materials such as paper or shaped wooden articles, or the resin may be heated with wood flour, wood chips, cotton linters, asbestos or other fibrous materials to form semi-rigid or rigid structural shapes.

The following examples are introduced for the purpose of illustrating the present process and the properties of the products obtained from the condensation of typical reactants as disclosed herein. In thus citing specific applications of the invention, it is not intended thereby to limit the generally broad scope of the invention in accordance with the conditions and reactions utilized therein.

Example I

A mixture of 16.2 g. of p-diacetylbenzene, 23.6 g. of m-benzenedisulfonamide and 18.5 g. of p-acetylbenzenesulfonamide was heated in a nitrogen atmosphere at 145–150° C. for 3.5 hours. The resultant yellowish solid, on cooling, was a tough resin of softening point about 250–265° F.

A similar mixture was refluxed in commercial xylene (150 cc.) until the solution became cloudy, and the vapors were then slowly distilled overhead until the water layer of the condensed vapors reached a volume of about 5.1 cc. The xylene was thereupon removed in vacuo, leaving a product which was lighter in color than that formed above and which did not soften in boiling water or at higher temperatures, up to about 150° C.

Example II

A mixture of 52.4 grams (0.2 moles) of 1-acetyl-2,4-benzenedisulfonamide and 16 grams (0.1 mole) of m-diacetylbenzene was dissolved in 250 cc. of xylene and the mixture refluxed at the boiling point of xylene for six hours an overhead distillate comprising water vapor being taken from the top of the reflux condenser as the reflux distillation continued. The condenser was then removed, the xylene solvent distilled off and the residue heated under vacuum to remove the remaining xylene vapor. The residual resinous product is a light tan-colored, thermosetting resin having a softening point above the boiling point of water.

Example III

A mixture of p-benzenedicarboxamide (16.5 gr. or 0.1 mole) and p-diacetylbenzene (16 grams or 0.1 mole) was heated in a refluxing solution thereof in xylene for six hours and the resinous product recovered in accordance with the procedure described above. The residue left after evaporation of the xylene solvent consisted of a substantially clear, colorless solid having a softening point above the boiling point of water.

We claim as our invention:

1. A process for the preparation of a resinous material which comprises reacting at a condensation temperature of from about 50° to about 350° C. a non-intracondensable ketoamide selected from the group consisting of the keto-substituted sulfonamides, carboxamides and thio acid amides with an aromatic polyketone in which the keto groups are the only reactive groups and a polysulfonamide in which sulfonamide groups are the only reactive groups and in which each sulfonamide group contains at least one hydrogen atom attached to the nitrogen atom of the group.

2. A process for the preparation of a resinous material which comprises reacting at a condensation temperature of from about 50° to about 350° C. a non-intracondensable aromatic ketoamide in which the keto and amido substituents are present on nuclear aryl groups separated by at least one nuclear carbon atom with at least one compound selected from the group consisting of an aromatic polyketone in which the keto groups are the only reactive groups and a polysulfonamide in which the sulfonamide groups are the only reactive groups and in which each sulfonamide group contains at least one hydrogen atom attached to the nitrogen atom of the group.

3. The process of claim 1 further characterized in that said aromatic polyketone is a diacetylbenzene.

4. The process of claim 2 further characterized in that said compound is a diacetylbenzene.

5. The process of claim 1 further characterized in that said polysulfonamide is a benzene disulfonamide.

6. The process of claim 2 further characterized in that said compound is a benzene disulfonamide.

7. The process of claim 1 further characterized in that said reaction is executed in the presence of an inert organic solvent in which said ketoamide, aromatic polyketone and polysulfonamide are soluble in the proportions utilized in the process.

8. The process of claim 7 further characterized in that said solvent is xylene.

9. The resinous condensation product resulting from the reaction at a condensation temperature of from about 50° to about 350° C. of a non-intracondensable ketoamide selected from the group consisting of the keto-substituted sulfonamides, carboxamides and thio acid amides with an aromatic polyketone in which the keto groups are the only reactive groups and a polysulfonamide in which the sulfonamide groups are the only reactive groups and in which each sulfonamide group contains at least one hydrogen atom attached to the nitrogen atom of the group.

10. The resinous condensation product resulting from the reaction at a condensation temperature of from about 50° to about 350° C. of a non-intracondensable aromatic ketoamide in which the keto and amido substituents are present on nuclear aryl groups separated by at least one nuclear carbon atom with at least one compound selected from the group consisting of an aromatic polyketone in which the keto groups are the only reactive groups and a polysulfonamide in which the sulfonamide groups are the only reactive groups and in which each sulfonamide group contains at least one hydrogen atom attached to the nitrogen atom of the group.

11. The resinous condensation product resulting from the reaction at a condensation temperature of from about 50° to about 350° C. of a non-intracondensable aromatic ketoamide in which the keto and amido substituents are present on nuclear aryl groups separated by at least one nuclear carbon atom with an aromatic polyketone in which the keto groups are the only reactive groups and a polysulfonamide in which the sulfonamide groups are the only reactive groups and in which each sulfonamide group contains at least one hydrogen atom attached to the nitrogen atom of the group.

References Cited in the file of this patent

UNITED STATES PATENTS

| | | |
|---|---|---|
| 2,279,752 | Jacobson | Apr. 14, 1942 |
| 2,366,494 | D'Alelio | Jan. 2, 1945 |
| 2,367,036 | McQueen | Jan. 9, 1945 |
| 2,520,917 | Dickey | Sept. 9, 1950 |